(12) United States Patent
Hill et al.

(10) Patent No.: US 11,467,939 B2
(45) Date of Patent: Oct. 11, 2022

(54) RECONSTRUCTING MIXED REALITY CONTEXTUALLY DERIVED ACTIONS

(71) Applicant: Microsoft Technology Licensing, LLC, Redmond, WA (US)

(72) Inventors: Erik A. Hill, Redmond, WA (US); Jonathan Gustav Paulovich, Redmond, WA (US); Michael William Schultz, Seattle, WA (US); Dylan Edmund Pierpont, Redmond, WA (US); Gabriel Robert Maricich, Issaquah, WA (US); Charles L. Harrison, North Bend, WA (US); Todd A Omotani, Redmond, WA (US); Kathleen Carol Heasley, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 306 days.

(21) Appl. No.: 16/906,802

(22) Filed: Jun. 19, 2020

(65) Prior Publication Data

US 2021/0397533 A1    Dec. 23, 2021

(51) Int. Cl.
*G06K 9/00* (2022.01)
*G06F 11/32* (2006.01)
*G06F 16/245* (2019.01)
*G06F 16/248* (2019.01)
*G06F 3/01* (2006.01)
*G06F 11/30* (2006.01)
*G06F 11/34* (2006.01)

(52) U.S. Cl.
CPC ............ *G06F 11/323* (2013.01); *G06F 3/011* (2013.01); *G06F 11/302* (2013.01); *G06F 11/3438* (2013.01); *G06F 16/245* (2019.01); *G06F 16/248* (2019.01)

(58) Field of Classification Search
CPC ...... G06F 11/323; G06F 3/011; G06F 11/302; G06F 11/3438; G06F 16/245; G06F 16/248; G06V 40/25; A63F 13/212; A63F 13/213; A63F 13/215; A63F 13/25; A63F 13/428; A63F 13/5255; A63F 13/211
See application file for complete search history.

(56) References Cited

U.S. PATENT DOCUMENTS

| | | | |
|---|---|---|---|
| 2010/0208033 A1* | 8/2010 | Edge | G06T 19/006 348/46 |
| 2014/0267611 A1 | 9/2014 | Kennett et al. | |
| 2020/0188028 A1 | 6/2020 | Feiner et al. | |

OTHER PUBLICATIONS

"Walking", Retrieved From: https://en.wikipedia.org/w/index.php?title=Walking&oldid=674211580, Aug. 2, 2015, 12 Pages.

(Continued)

*Primary Examiner* — Hassan Mrabi
(74) *Attorney, Agent, or Firm* — Schwegman Lundberg & Woessner, P.A.

(57) ABSTRACT

A computer implemented method includes recording data representative of a user experience sensed by a mixed reality device during a mixed reality experience of a user in a space, processing the recorded data to infer one or more actions performed by the user in the space during the mixed reality experience, and creating an augmented replay of the mixed reality experience based on the recorded data and inferred actions performed by the user during the mixed reality experience.

20 Claims, 6 Drawing Sheets

(56) References Cited

OTHER PUBLICATIONS

"International Search Report and Written Opinion Issued in PCT Application No. PCT/US2021/034666", dated Sep. 14, 2021, 10 Pages.

* cited by examiner

RECONSTRUCTING MIXED REALITY CONTEXTUALLY DERIVED ACTIONS

BACKGROUND

In many MR (mixed reality) experiences, a space such as a room or structure is represented digitally. During an MR experience, data can be collected via a user worn headset regarding the position or actions of users. The collected data can be analyzed to better understand what the user was doing during the experience. After the experience, the movement of the MR device through space can be discerned, but generally there is no knowledge of what the body of the user was doing during the experience.

SUMMARY

A computer implemented method includes recording data representative of a user experience sensed by a mixed reality device during a mixed reality experience of a user in a space, processing the recorded data to infer one or more actions performed by the user in the space during the mixed reality experience, and creating an augmented replay of the mixed reality experience based on the recorded data and inferred actions performed by the user during the mixed reality experience.

DETAILED DESCRIPTION

Figure 1:
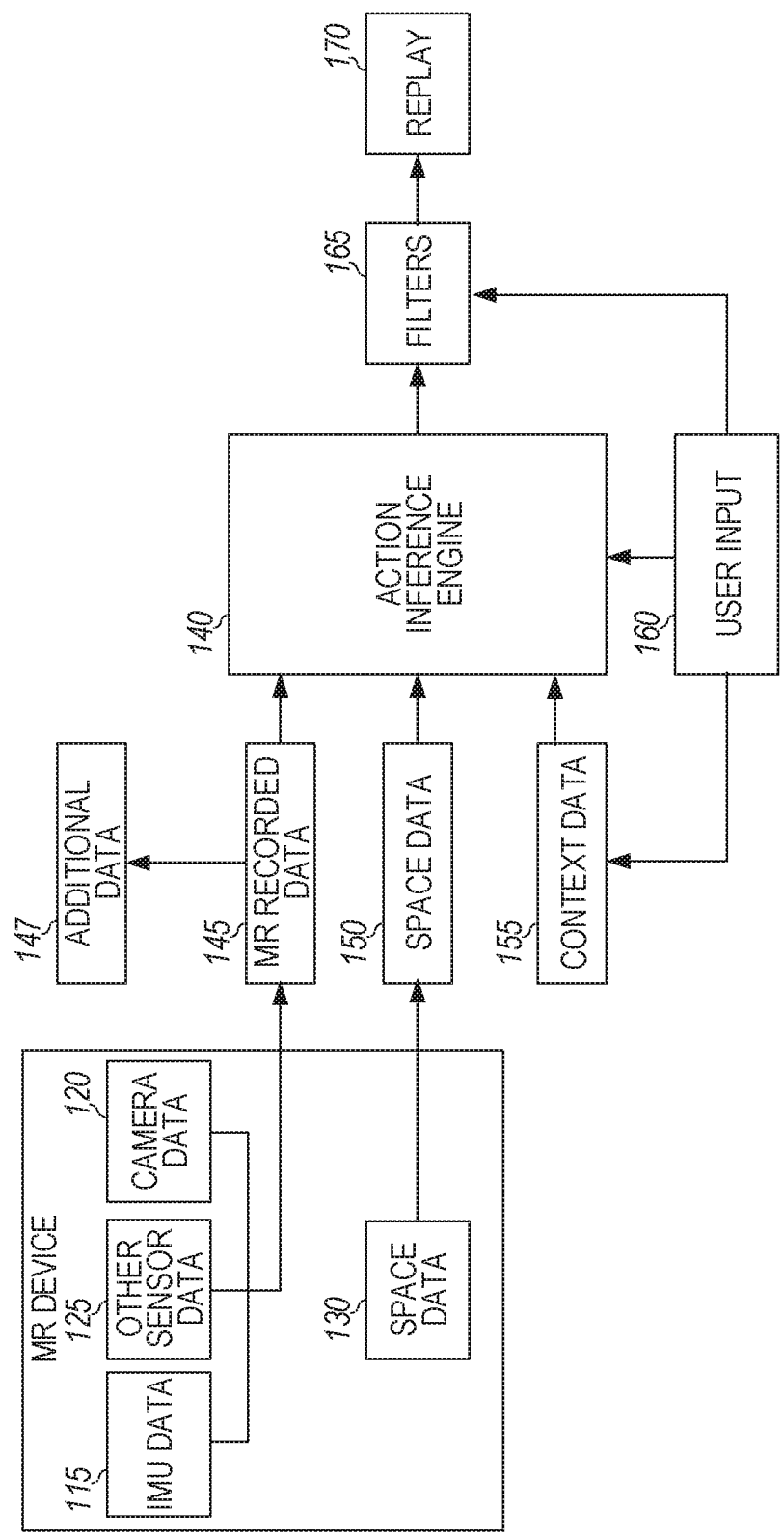
FIG. 1 is a block diagram representation of a system for generating an animated view of recorded user mixed reality (MR) experiences according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

In many MR (mixed reality) experiences, a space such as a room or structure is represented digitally. During an experience, data can be collected on the position or actions of users. The collected data can be analyzed to better understand some of the actions that were taken. The actions can be broken up into two groups: physical actions that can be reconstructed, and secondary actions.

While mixed reality and augmented reality headsets record inertial motion data in response to movement of the head of a user wearing the headset, the motion data may not directly indicate the actions of the body of the user, or the intent behind such actions. The actions and intent of such actions can be very helpful in determining if processes are being followed, such as inspecting under a car in a security setting or performing some required action in a manufacturing process. Video that may be captured by a headset camera may not be revealing of the actual actions as a field of view of the camera.

The recorded data can be kept, and future calculations or insights can be derived later when someone would like to query the MR recorded data in a new way to gain different insights. To put it in another way, this is like taking all recording data from a multi-user MR experience, and using it as a queryable data set, where many different types of queries may include looking at contextually derived actions which may or may not be known at the time of the recording.

For physical actions in a known space, a user wearing an MR device such as a headset proceeds through an experience in the digitally represented space. Data is recorded in time and space by the MR device. After the experience, the movement of the MR device through space may be discerned and visually represented based on the recorded data and data representative of the space. However, there is no representation of what the body of the user was actually doing.

In various embodiments of the present inventive subject matter, the position or action of the body during an MR experience in a space can be estimated and used to facilitate creation of animations by a system. The animations can be played, essentially providing a visual replay of the user experience, including a view of the body of the user with the user represented as an avatar.

FIG. 1 is a block diagram representation of a system 100 for generating an animated view of recorded user MR experiences. An MR device 110 is used to record different types of data, such as inertial motion unit (IMU) data 115, camera data 120, and other data 125. IMU data may be provided by an inertial sensor available in commercial MR headsets. IMU data generally includes data representing inertial motion in six degrees of freedom comprising motion to the left, right, forward, backward, up, and down. Camera data 120 may include video and depth data. Other sensor data may include sound collected by a microphone, user eye tracking information, and other data such as temperature. Other sensor data may also include heart rate and other physiological data in further embodiments.

MR device 110 also includes space data 130. Space data 130 may be created by initially using the MR device 110 to scan a space such as a room or structure to capture a digital representation of the space in which an MR experience is to occur. If the space has been previously scanned, space data 130 may already be stored and simply retrieved to facilitate the MR experience. The digital representation of the space may be generated in many different ways and digital representations for multiple spaces may be saved for various MR experiences. A space may be scanned using a device, such as a Microsoft HoloLens® 2 device, by slowly walking around the room and looking at various structures such as walls, ceiling, floor, furniture, etc. In further embodiments, multiple devices may be used to perform the scan and collaborate to contribute geometry. Different devices, such as AR devices and other devices that may utilize LIDAR or other ranging mechanisms may be used in further embodiments. The scan comprises a geometry scan and may be performed by any device that can capture distances to objects and surfaces within a space and generate a triangle mesh representation of the space comprising the space data.

Following the MR experience, experience data, including recorded data is made available to an action inference engine 140. The action inference engine 140 may be executed in cloud-based computing resources, server based resources, the MR device, or other computing resources. Recorded data 145 includes IMU data 115, camera data 120 and other sensor data 125. Such data may be processed by the MR device 110 to be representative of the MR device 110 position in the MR space. In addition, recorded data 145 may also include raw sensor data from the MR device 110 and additional data 147 captured during the recording of the MR experience. Such additional data 147 may include data items such as user IDs, meta data, data from controllers used, and other data. The space data 130 is also provided at space data 150.

Context data 155 may be provided via user input 160. The user input may be provided by user interaction with MR device 110, or via separate input mechanisms in communication with action inference engine 140, such as a keyboard, microphone, or other devices. The context data may include user data notations, filters, queries, and other input for both providing a context for the user MR experience and for querying stored user experiences, such as searching for particular actions that have been inferred.

Filters 165 may be used to select inferred actions that are considered meaningful for the replay. Users input 160 may be used to define inferred actions for the filter 165 to pass or reject for the replay. For instance, in trying to determine whether a security guard was looking under cars, inferences of jumping or running may be filtered out. The user input 160 may also be used to override filters at 165 to modify or select a replay 170 that has been created using the recorded data and the action inferences generated by the inference engine.

The replay may be created using a calculated inference of what the user was actually doing to create a character avatar body that performs the inferred actions in the digital representation of the space. For instance, when a user is wearing an MR device 110, the user's height can be inferred through several methods, such as taking an average height maximum over time or having a setup phase where the user stands still while standing tall. The user's height could also be retrieved from a server having physical information, such as meta data, about the user. Based on the user height and the current MR device height in the recording, the system can infer that a user was crouching if the difference in such heights meets a threshold number or percentage.

Further IMU data may be used to infer that the user was crouching to the left or the right based on selected thresholds of motion detected while the height difference was changing. Based on MR device movement, and inertial motion unit (IMU) data provided by the MR device 110, the action inference engine 140 infers actions, such as that the user is walking, how fast they are walking, and the time at which a step is taken, Leaning, jumping, talking, laying down, crawling, using a specific tool (especially those tools with a distinct sound/user vibration), etc.

Figure 2:
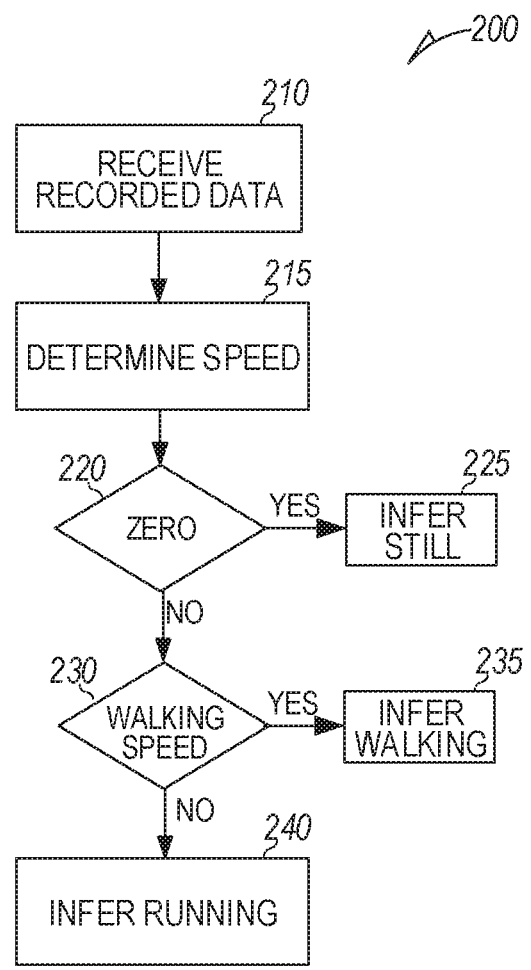
FIG. 2 is a flowchart illustrating an example method executed to infer actions according to an example embodiment.

FIG. 2 is a flowchart illustrating an example method 200 executed by the inference engine 140 to infer actions. Each action may have an algorithm corresponding to the action, or a single algorithm may be used to infer multiple different actions.

Each of the algorithms may receive the recorded data and other data in some instances at operation 210. Method 200 is an algorithm designed to infer an action based on the speed of the user at each given point in time during the experience and to determine that the user is still, walking, or running. At operation 215, an instantaneous speed of the user is determined based on a change in position of the user over time. The speed may also be provided directly by MR device 110. At decision operation 220, method 200 determines if the speed is at or near zero. A threshold may be used, such as less than 0.1 kilometers per hour. If yes, operation 220 infers that the current action is that the user is still or not moving at 225.

If the user is not determined to be still at decision operation 220, decision operation 230 compares the speed to a threshold range, such as movement between 0.1 and 5 kilometers per hour. If the current speed is within the threshold, walking is inferred as indicated in operation 235. Other data may also be indicative of walking, such as small MR device head movements generally associated with walking. If the speed is greater than 5 kilometers per hour, running is inferred at operation 240. Running may be similarly determined based on a higher speed, while running and sprinting will have even higher associated speeds and different MR device movements associated with the head of the user.

Method 200 may be repeated periodically during the experience recording to determine the times during which each action is occurring. The speeds and actions may be used to generate the replay 170. Head movements and other actions that might be occurring during the same time as these locomotive actions may also be provided to facilitate a more accurate replay 170.

Machine learning techniques for identifying actions may also be used. Training data sets for training one or more models may include recorded data that is labeled with associated actions. The training data may include user specific prior recorded data that is labeled or may even include labeled data from multiple users in further embodiments.

These inferred actions can be tied into an animated replay of the user actions in the space with the user represented by an avatar. Another instance might be if the user swings a hammer. When the hammer hits a real object in the space, the IMU data 115 reflects a vibration, and facilitates cueing a hammer-swinging animation to occur before the actual strike occurs in the replay 170. Sounds recorded during the experience may also or alternatively be used to trigger cueing of a hammer swinging animation or even trigger an algorithm to determine if the vibration data is actually representative of the user being the origin of the hammer swing and strike. Similar inferences may be made based on sensor data corresponding to a user's jump or if the user was holding a gun controller with realistic recoil. Such inferred actions may be used to animate the avatar of the user in the replay.

Secondary actions that are not directly recorded, can also be inferred from the recorded data. The secondary actions may be inferred from a known a cause/effect relation. For instance, the MR device 110 may record data indicative of a user walking to a virtual or real closed door based both on motion and proximity to the door based on position within the space, leaning away from the closed door, and then walking through the doorway. From this primary recorded data, the system infers that the door was opened (since the user passed through it) and then add that event/door animation to the replay, even if the door was in no way recorded during the event. Using similar methods, the action inference engine can infer holographic objects the user was focusing on (based on head position), and what holograms they might not have yet noticed, even though none of this was directly in the recorded data.

In further embodiments, it can be inferred that the user was looking or gazing at a holographic object, such as an apple based on the IMU data 115. Eye tracking data can also be used to more accurately detect that the user was gazing at the holographic object. Such an inference can be used in the replay to paint the surface of the object with color, such as red or green for the apple while the apple is within the field of view of the user.

Furthermore, if user intentions or rule sets are applied to the data, further actions can be marked up or animated. In one example, four users wearing HMDs are in an MR experience with holographic monsters. Three of the characters travel together while one user moves by themselves in the experience. This is all that is recorded in the data, along with the position of the monsters. By applying intentions obtained from additional data 147 or entered via user input 160, better derived actions can be extrapolated and represented in the reply. For instance, was this user scouting? If so, the actions can be better analyzed as trying to avoid the fields of views of holographic monsters. The area the user was scouting may also be marked as a 'cleared' area for the players' team. In the case that this user was actually on the team of the monsters, the user actions should be taken in the same way, but for the other team. Did this user just need to take a break and was trying to leave the experience? If so, the replay 170 can be animated with the character out of the experience. Such replays with inferred actions have applications for games but may also be used in many different scenarios such as MR training simulations.

In further embodiments, the replay may also be used to provide a visual representation of the user speaking based on recorded voice sounds, or of the user striking an object based on recorded sounds of a real object being hit.

The replay 170 may be generated by any suitable animation system to recreate the reality not specifically recorded based on the space data to provide views from different perspectives, such as that of an outside observer of the space from any angle. Zooming and panning features may also be utilized to evaluate the actions and overall performance of the user in the case of teaching, training, sports, or work environments.

Commercially available animation systems may be used by an artist to create the replays. Motion captured from an actor may also be used and cleaned up by an artist in some animation systems. For example, given an inferred action of 'open a soda,' an artist may make the animation and character model for the inferred action. When the inferred action is detected by the system, the system simply gives a command to the player avatar to "play open soda animation."

Based on input from the system, the animation speed, direction, intensity, etc. can be changed. For instance, a walk animation might be one footfall every 500 ms. Based on data from the system, the animation could be played faster/slower to match the user's recorded foot falls. Furthermore, if the user's head is very steady, the animation can lower the intensity to show the avatar lightly walking. In contrast, if the user's head was less steady with more vibration, the animation intensity can increase, to show the walk as more of a stomp.

In one embodiment, actions inferred by action inference engine 140 may be stored in memory for future use, such as at one or more of MR recorded data 145, space data 150, and context data 155, or even in a separate storage device as a database. User input 160 may be used to select replays to view as well as to query the data stored at 145, 150, and 155 or other storage corresponding to one or more replays.

Queries may include many different aspects of user experiences, including inferred actions.

User input 160 may also be used to add to or modify the recorded data. Roles of users may be set up prior to the experience but may have changed during the experience. An interview of the user following the experience may collect the user input 160 to identify a different role actually being played in the experience, allowing a change of the role in the recorded data. Users may even be interviewed to confirm that certain inferred actions were actually being performed, allowing for change of the inferred action or actions. For example, the data may indicate that the user's head moved down and the user can be asked what they were doing at the time and what their intention was. Intentions of actions may also be updated. In one example, intentions can also be inferred. In the case of a security guard, a change to a lower elevation of the MR device 110 may be used to infer that the guard was looking under a car for security reasons. An interview may reveal a different intent, such as checking for a leak or to remove debris.

Figure 3:
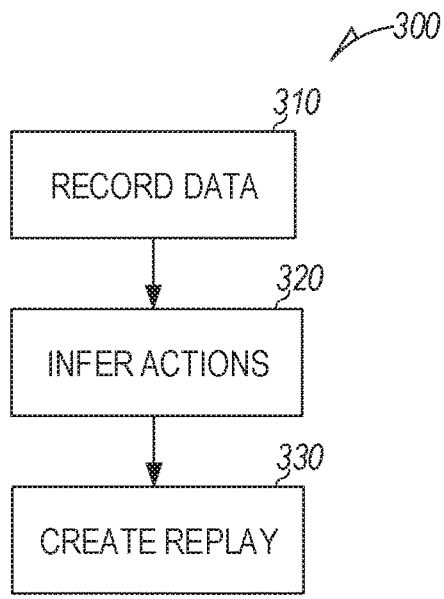
FIG. 3 is a flowchart illustrating a method of inferring actions and creating an animated replay of a mixed reality (MR) experience of one or more users wearing MR devices according to an example embodiment.

FIG. 3 is a flowchart illustrating a method 300 of inferring actions and creating an animated replay of a mixed reality (MR) experience of one or more users wearing MR devices. At operation 310, data representative of a user experience sensed by a mixed reality device during a mixed reality experience of a user is recorded. The recorded data is processed at operation 320 to infer actions performed by the user during the mixed reality experience. At operation 330, augmented replay of the mixed reality experience is created based on the recorded data and inferred actions. The replay provides representation of the user that reflects the inferred actions performed by the user during the experience.

In one example, the augmented replay includes an avatar representing the user, wherein the avatar is performing the inferred one or more actions.

In a further example, the recorded data includes user position over time data within the digitally represented space. Processing the recorded data may include determining a speed of the user from the position over time data and inferring a walking action or a running action in response to the determined speed.

Figure 4:
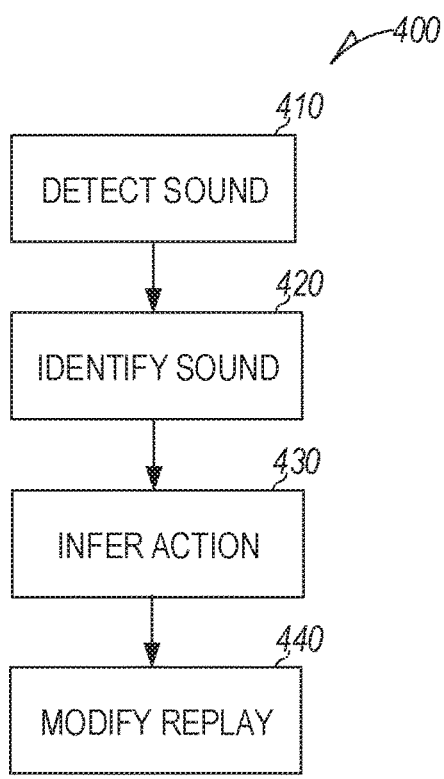
FIG. 4 is a flowchart illustrating a method of inferring a further action according to an example embodiment.

FIG. 4 is a flowchart illustrating a method 400 of inferring a further action. At operation 410, it is detected that the recorded data includes a particular sound such as the sound of a hammer striking an object that occurred during the mixed reality experience. Alternatively, vibration associated with a hammer strike may be detected. The particular sound or vibration or both may be identified as corresponding to a known action at operation 420. At operation 430, the action is inferred based on the identified sound or vibration or both. The augmented replay may be updated to reflect the inferred action at operation 440.

Figure 5:
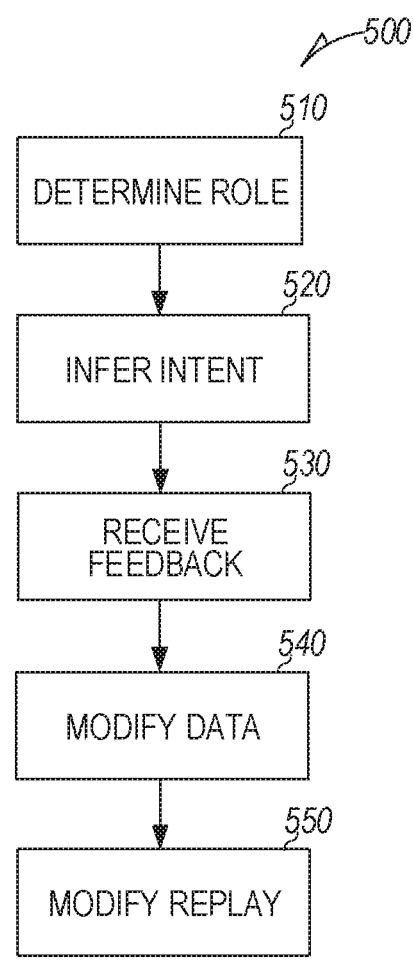
FIG. 5 is a flowchart illustrating a method of inferring intent based on the recorded data according to an example embodiment.

FIG. 5 is a flowchart illustrating a method 500 of inferring intent based on the recorded data. At operation 510, a role of the user is determined from the recorded data. The recorded data is processed at operation 520 to infer an intent of the user during one of the one or more inferred actions as a function of the role. Feedback regarding the inferred intent may be received at operation 530 and used to modify the recorded data at operation 540 based on the received feedback. The augmented replay may be modified at operation 550 based on the modified recorded data.

Figure 6:
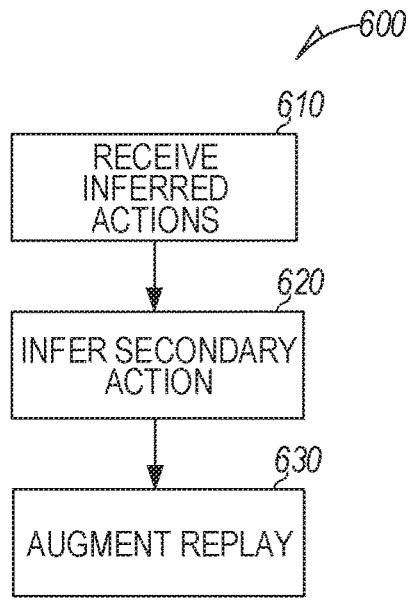
FIG. 6 is a flowchart illustrating a method of inferring a secondary action according to an example embodiment.

FIG. 6 is a flowchart illustrating a method 600 of inferring a secondary action. At operation 610, inferred actions are received. At operation 620, a secondary action is inferred based on one or more inferred actions. The augmented replay may then be generated or modified at operation 630 as a function of the inferred secondary action.

Figure 7:
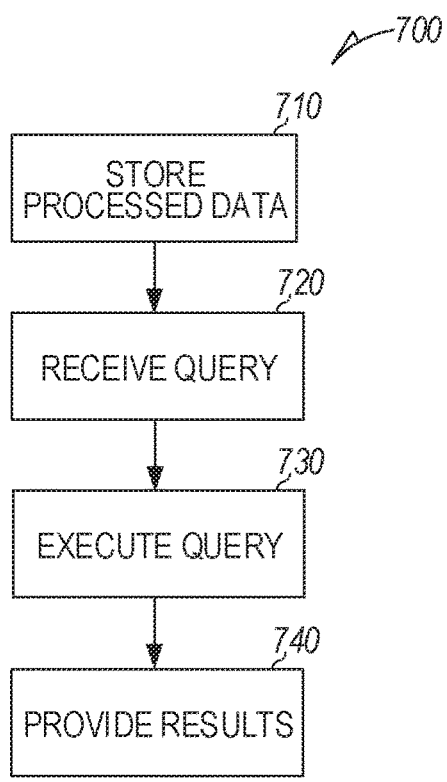
FIG. 7 is a flowchart illustrating a method of querying the data representative of user MR experiences according to an example embodiment.

FIG. 7 is a flowchart illustrating a method 700 of querying the data representative of user MR experiences. Recorded MR experience data that has been processed to infer actions is stored at operation 710. The data may include data from one or more user experiences of one or multiple users. At operation 720, a query from a user related to actions is received. The received query is then executed against the stored data to generate results at operation 730. At operation 740, the results are provided for storage or display to a user via user input 160. The results may be in the form of a list with links to one or more replays where the items in the list occur. The result may also be an aggregation of the number of occurrences of one or more actions that were the subject of the query.

One example query may request the number of meters a user walked, jogged, ran, or traveled during one or more MR experiences. Another example may request how many times the user crouched, or the amount of time spent in a crouched position. Specific inferred actions may be queried as well.

Figure 8:
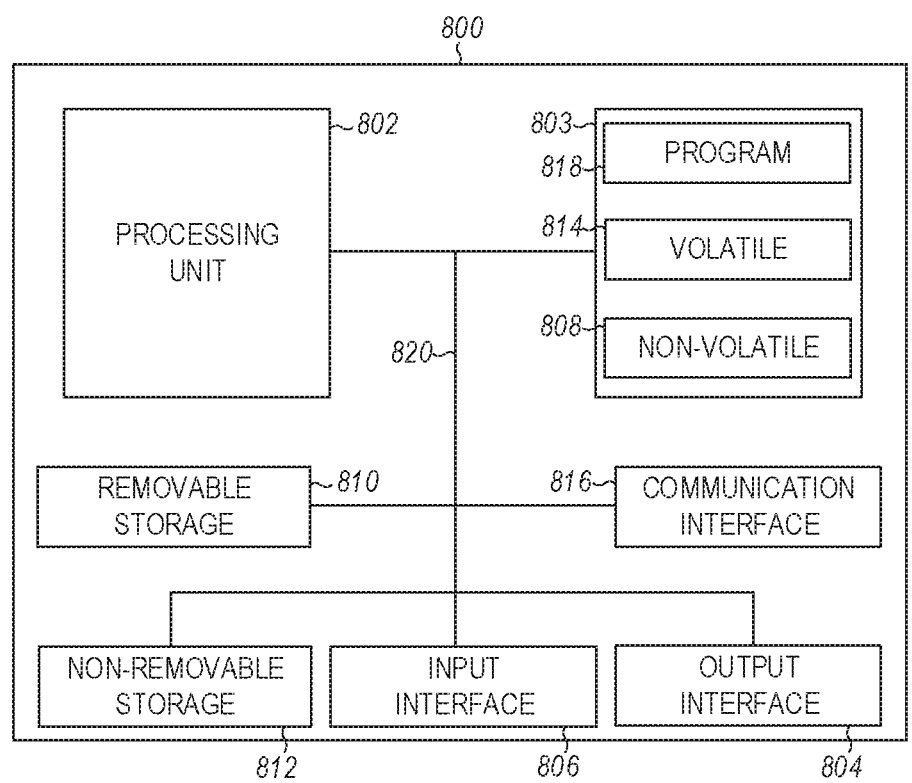
FIG. 8 is a block schematic diagram of a computer system to implement one or more example embodiments.

FIG. 8 is a block schematic diagram of a computer system 800 to infer actions from recordings of MR experiences and for performing methods and algorithms according to example embodiments. All components need not be used in various embodiments. For instance, the MR device 110 may include processors, memory devices, programming, and displays, we well as additional sensors as previously described. The inference engine 140 may also include processors, memory, displays, and user I/O devices as well as communication capabilities for receiving and sending data.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more methods described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 818 along with the workspace manager 822 may be used to cause processing unit 802 to perform one or more methods or algorithms described herein.

Examples

1. A computer implemented method includes recording data representative of a user experience sensed by a mixed reality device during a mixed reality experience of a user in a space, processing the recorded data to infer one or more actions performed by the user in the space during the mixed reality experience, and creating an augmented replay of the mixed reality experience based on the recorded data and inferred actions performed by the user during the mixed reality experience.

2. The method of example 1 wherein the augmented replay includes an avatar representing the user, wherein the avatar is performing the inferred one or more actions.

3. The method of any of examples 1-2 wherein the recorded data includes user position data at multiple times during the mixed reality experience within the space and wherein processing the recorded data includes determining a speed of the user from the position over time data, and inferring a walking action in response to the determined speed.

4. The method of any of examples 1-3 wherein the recorded data includes user position data at multiple times during the mixed reality experience within the space and wherein processing the recorded data includes determining a speed of the user from the position over time data, and inferring a running action in response to the determined speed.

5. The method of any of examples 1-4 wherein the recorded data includes sounds occurring during the mixed reality experience and wherein processing the recorded data includes identifying a sound associated with an action, and inferring the action based on the identified sound.

6. The method of any of examples 1-5 wherein the recorded data includes a role of the user, and wherein processing the recorded data includes inferring an intent of the user during one of the one or more inferred actions as a function of the role.

7. The method of example 6 and further including receiving feedback regarding the inferred intent, modifying the recorded data based on the received feedback, and modifying the augmented replay based on the modified recorded data.

8. The method of any of examples 1-7 and further comprising inferring a secondary action based on one or more inferred actions, and wherein the augmented replay is generated as a function of the inferred secondary action.

9. The method of any of examples 1-8 and further including querying the processed recorded data for inferred actions and providing results of the query.

10. A machine-readable storage device having instructions for execution by a processor of a machine to cause the processor to perform operations to perform a method, the operations including recording data representative of a user experience sensed by a mixed reality device during a mixed reality experience of a user in a space, processing the recorded data to infer one or more actions performed by the user in the space during the mixed reality experience, and creating an augmented replay of the mixed reality experience based on the recorded data and inferred actions performed by the user during the mixed reality experience.

11. The device of example 10 wherein the augmented replay includes an avatar representing the user, wherein the avatar is performing the inferred one or more actions.

12. The device of any of examples 10-11 wherein the recorded data includes user position data at multiple times during the mixed reality experience within the space and wherein processing the recorded data includes operations of determining a speed of the user from the position over time data, and inferring a walking action in response to the determined speed or inferring a running action in response to the determined speed.

13. The device of any of examples 10-12 wherein the recorded data includes sounds occurring during the mixed reality experience and wherein processing the recorded data includes operations of identifying a sound associated with an action, and inferring the action based on the identified sound.

14. The device of any of examples 10-13 wherein the recorded data includes a role of the user, and wherein processing the recorded data includes operations to infer an intent of the user during one of the one or more inferred actions as a function of the role.

15. The device of example 14 and further including operations of receiving feedback regarding the inferred intent, modifying the recorded data based on the received feedback, and modifying the augmented replay based on the modified recorded data.

16. The device of any of examples 10-15 and further including operations of inferring a secondary action based on one or more inferred actions, and wherein the augmented replay is generated as a function of the inferred secondary action.

17. The device of any of examples 10-16 and further includes operations of querying the processed recorded data for inferred actions and providing results of the query.

18. A device includes a processor and a memory device coupled to the processor and having a program stored thereon for execution by the processor to perform operations. The operations include recording data representative of a user experience sensed by a mixed reality device during a mixed reality experience of a user in a space, processing the recorded data to infer one or more actions performed by the user in the space during the mixed reality experience, and creating an augmented replay of the mixed reality experience based on the recorded data and inferred actions performed by the user during the mixed reality experience.

19. The device of example 18 wherein the augmented replay includes an avatar representing the user, wherein the avatar is performing the inferred one or more actions, and further including operations of inferring a secondary action based on one or more inferred actions, wherein the augmented replay is generated as a function of the inferred secondary action, receiving feedback regarding the inferred intent, modifying the recorded data based on the received feedback, and modifying the augmented replay based on the modified recorded data.

20. The device of any of examples 18-19 wherein the recorded data includes user position data at multiple times during the mixed reality experience within the space and wherein processing the recorded data includes operations of determining a speed of the user from the position over time data and inferring a walking action in response to the determined speed or inferring a running action in response to the determined speed.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
recording data representative of a user experience sensed by a mixed reality device during a mixed reality experience of a user in a space;
processing the recorded data to infer one or more actions performed by the user in the space during the mixed reality experience; and
creating an augmented replay of the mixed reality experience based on the recorded data and inferred actions performed by the user during the mixed reality experience.

2. The method of claim 1 wherein the augmented replay includes an avatar representing the user, wherein the avatar is performing the inferred one or more actions.

3. The method of claim 1 wherein the recorded data includes user position data at multiple times during the mixed reality experience within the space and wherein processing the recorded data comprises:
determining a speed of the user from the position over time data; and
inferring a walking action in response to the determined speed.

4. The method of claim 1 wherein the recorded data includes user position data at multiple times during the mixed reality experience within the space and wherein processing the recorded data comprises:
determining a speed of the user from the position over time data; and
inferring a running action in response to the determined speed.

5. The method of claim 1 wherein the recorded data includes sounds occurring during the mixed reality experience and wherein processing the recorded data comprises:
identifying a sound associated with an action; and
inferring the action based on the identified sound.

6. The method of claim 1 wherein the recorded data includes a role of the user, and wherein processing the recorded data includes inferring an intent of the user during one of the one or more inferred actions as a function of the role.

7. The method of claim 6 and further comprising:
receiving feedback regarding the inferred intent;
modifying the recorded data based on the received feedback; and
modifying the augmented replay based on the modified recorded data.

8. The method of claim 1 and further comprising inferring a secondary action based on one or more inferred actions, and wherein the augmented replay is generated as a function of the inferred secondary action.

9. The method of claim 1 and further comprising:
querying the processed recorded data for inferred actions; and
providing results of the query.

10. A machine-readable storage device having instructions for execution by a processor of a machine to cause the processor to perform operations to perform a method, the operations comprising:
recording data representative of a user experience sensed by a mixed reality device during a mixed reality experience of a user in a space;
processing the recorded data to infer one or more actions performed by the user in the space during the mixed reality experience; and
creating an augmented replay of the mixed reality experience based on the recorded data and inferred actions performed by the user during the mixed reality experience.

11. The device of claim 10 wherein the augmented replay includes an avatar representing the user, wherein the avatar is performing the inferred one or more actions.

12. The device of claim 10 wherein the recorded data includes user position data at multiple times during the mixed reality experience within the space and wherein processing the recorded data includes operations comprising:
determining a speed of the user from the position over time data; and
inferring a walking action in response to the determined speed or inferring a running action in response to the determined speed.

13. The device of claim 10 wherein the recorded data includes sounds occurring during the mixed reality experience and wherein processing the recorded data includes operations comprising:
identifying a sound associated with an action; and
inferring the action based on the identified sound.

14. The device of claim 10 wherein the recorded data includes a role of the user, and wherein processing the recorded data includes operations to infer an intent of the user during one of the one or more inferred actions as a function of the role.

15. The device of claim 14 and further including operations comprising:
receiving feedback regarding the inferred intent;
modifying the recorded data based on the received feedback; and modifying the augmented replay based on the modified recorded data.

16. The device of claim 10 and further including operations comprising inferring a secondary action based on one or more inferred actions, and wherein the augmented replay is generated as a function of the inferred secondary action.

17. The device of claim 10 and further includes operations comprising:
  querying the processed recorded data for inferred actions; and
  providing results of the query.

18. A device comprising:
  a processor; and
  a memory device coupled to the processor and having a program stored thereon for execution by the processor to perform operations comprising:
    recording data representative of a user experience sensed by a mixed reality device during a mixed reality experience of a user in a space;
    processing the recorded data to infer one or more actions performed by the user in the space during the mixed reality experience; and
    creating an augmented replay of the mixed reality experience based on the recorded data and inferred actions performed by the user during the mixed reality experience.

19. The device of claim 18 wherein the augmented replay includes an avatar representing the user, wherein the avatar is performing the inferred one or more actions, and further including operations comprising:
  inferring a secondary action based on one or more inferred actions, wherein the augmented replay is generated as a function of the inferred secondary action;
  receiving feedback regarding the inferred intent;
  modifying the recorded data based on the received feedback; and
  modifying the augmented replay based on the modified recorded data.

20. The device of claim 18 wherein the recorded data includes user position data at multiple times during the mixed reality experience within the space and wherein processing the recorded data includes operations comprising:
  determining a speed of the user from the position over time data; and
  inferring a walking action in response to the determined speed or inferring a running action in response to the determined speed.

* * * * *